US011945686B2

United States Patent
Drahohs-Föderler et al.

(10) Patent No.: US 11,945,686 B2
(45) Date of Patent: *Apr. 2, 2024

(54) METHOD AND DEVICE FOR MONITORING A STATE OF A PASSENGER TRANSPORT SYSTEM USING A DIGITAL DOUBLE

(71) Applicant: INVENTIO AG, Hergiswil (CH)

(72) Inventors: Andreas Drahohs-Föderler, Bad Fischau-Brunn (AT); Mark Dirk Blondiau, Vienna (AT); Dominik Prax-Marer, Vienna (AT); Gerhard Stoiber, Zistersdorf (AT); Herbert Schmied, Tulln (AT); Martin Ortbauer, Vienna (AT); Richard Schütz, Vienna (AT); Thomas Novacek, Schwechat (AT); Yixin Wu, Vienna (AT)

(73) Assignee: INVENTIO AG, Hergiswil (CH)

( * ) Notice: Subject to any disclaimer, the term of this patent is extended or adjusted under 35 U.S.C. 154(b) by 626 days.

This patent is subject to a terminal disclaimer.

(21) Appl. No.: 17/260,715

(22) PCT Filed: Jul. 4, 2019

(86) PCT No.: PCT/EP2019/067929

§ 371 (c)(1),
(2) Date: Jan. 15, 2021

(87) PCT Pub. No.: WO2020/016016

PCT Pub. Date: Jan. 23, 2020

(65) Prior Publication Data

US 2021/0292131 A1    Sep. 23, 2021

(30) Foreign Application Priority Data

Jul. 19, 2018 (EP) .................................... 18184372

(51) Int. Cl.
*B66B 25/00* (2006.01)
*G01S 13/04* (2006.01)
*B66B 21/04* (2006.01)

(52) U.S. Cl.
CPC ............ *B66B 25/006* (2013.01); *G01S 13/04* (2013.01); *B66B 21/04* (2013.01)

(58) Field of Classification Search
CPC ........ B66B 25/006; B66B 21/04; G01S 13/04
See application file for complete search history.

(56) References Cited

U.S. PATENT DOCUMENTS

| 7,894,934 B2 * | 2/2011 | Wallace | B65G 43/00 |
| | | | 198/341.01 |
| 2004/0197012 A1 * | 10/2004 | Bourg, Jr. | G06F 18/2132 |
| | | | 382/110 |

(Continued)

FOREIGN PATENT DOCUMENTS

| CN | 104401833 B | 10/2016 |
| CN | 106081848 A | 11/2016 |

(Continued)

OTHER PUBLICATIONS

Fei Tao et al, "Digital twin-driven product design, manufacturing and service with big data", The International Journal of Advanced Manufacturing Technology, London, vol. 94, No. 9-12, Mar. 16, 2015, pp. 3563-3576.

(Continued)

*Primary Examiner* — Tung S Lau
(74) *Attorney, Agent, or Firm* — Knobbe Martens Olson & Bear LLP

(57) ABSTRACT

The disclosure relates to monitoring a state of a physical passenger transport system. In an aspect, monitoring includes use of an updated digital double dataset that reproduces characterizing properties of components of the physical passenger transport system in an actual configuration of (Continued)

the passenger transport system after assembly and installation thereof in a building, in a machine-processable manner. At least one detection device is arranged in the physical passenger transport system, which detects a load profile which is transmitted to the updated digital double dataset. A set of rules is used to convert the load profile into modified characterizing properties of virtual components. Through the monitoring, changes and change trends on the components are tracked and evaluated using the updated digital double dataset by calculations and/or by static and dynamic simulations.

14 Claims, 5 Drawing Sheets

(56) References Cited

U.S. PATENT DOCUMENTS

| | | |
|---|---|---|
| 2010/0094798 A1 | 4/2010 | Shudo et al. |
| 2018/0148298 A1 | 5/2018 | De Angelis |
| 2018/0150806 A1 | 5/2018 | Elied et al. |
| 2018/0227277 A1 | 8/2018 | Fischer et al. |
| 2021/0276832 A1* | 9/2021 | Brestensky ........... B66B 25/006 |

FOREIGN PATENT DOCUMENTS

| | | |
|---|---|---|
| CN | 106586796 A | 4/2017 |
| CN | 108083044 A | 5/2018 |
| DE | 10 2015 217 855 A1 | 3/2017 |
| JP | 2008019022 A | 1/2008 |
| WO | WO 2018177708 A1 | 10/2018 |

OTHER PUBLICATIONS

International Search Report for International Application No. PCT/EP2019/067929 dated Oct. 11, 2019.

* cited by examiner

METHOD AND DEVICE FOR MONITORING A STATE OF A PASSENGER TRANSPORT SYSTEM USING A DIGITAL DOUBLE

TECHNICAL FIELD

The present application relates to a method and device for monitoring properties of a passenger transport system configured as an escalator or moving walkway. The application further relates to a passenger transport system equipped with a proposed device, to a computer program product configured to carry out the proposed method, and to a computer-readable medium storing this computer program product.

SUMMARY

Passenger transport systems in the form of escalators or moving walkways are used to convey passengers within edifices or buildings. Sufficient operational safety must always be ensured, but ideally also continuous availability. For this purpose, passenger transport systems are usually checked and/or serviced at regular intervals. The intervals are generally determined based on experience with similar passenger transport systems, wherein to ensure operational security the intervals must be selected to be short enough that a check or maintenance is performed in good time before any safety-endangering operating conditions occur.

In the case of older passenger transport systems, the checks are usually performed completely independently of the actual current state of the passenger transport system. This means that a technician has to visit the passenger transport system and inspect it on-site. It is often found that no urgent maintenance is necessary. The visit of the technician thus turns out to be superfluous and causes unnecessary costs. On the other hand, in the event that the technician actually detects the need for maintenance, in many cases an additional trip is required since the technician can only determine on-site which components of the passenger transport system require maintenance, and thus it is only apparent on-site that maintenance or repair is required, for example, that spare parts or special tools are needed. Another problem is that after a few years—in particular if the maintenance is carried out by third parties—there is no longer comprehensive technical documentation for the system and it is only possible to determine on-site which components are original and which components have been replaced by third-party products because there are a large number of suppliers exclusively for spare parts and for maintenance in this field.

In the case of newer passenger transport systems, it is sometimes already possible, for example, using sensors and/or by monitoring the active components of the system, for example, by monitoring the operation of a conveyor belt of the passenger transport system, to obtain notifications in advance and/or from an external control center that a state of the passenger transport system has changed and that a check or maintenance of the passenger transport system seems necessary. This means that maintenance intervals can hereby be extended or adjusted as required. However, a plurality of sensors are usually required, which means a considerable additional investment. Furthermore, the additional sensors can lead to an increased susceptibility to failure. In addition, even in this case, a technician can usually only detect whether there is actually a need for maintenance and whether spare parts or special tools may be needed by visiting the site.

Even with these systems, comprehensive technical documentation can no longer be expected after a certain period, depending on the maintenance provider.

Among other things, there may be a need for a method or a device using which properties of a passenger transport system can be monitored more efficiently, more simply, with less effort, without the need for an on-site inspection, and/or with greater predictability. There may also be a need for a suitably equipped passenger transport system, for a computer program product for carrying out the method on a programmable device, and for a computer-readable medium having such a computer program product stored thereon.

Such a need can be met with the subject matter according to any of the independent claims. Advantageous embodiments are defined in the dependent claims and the following description.

According to a first aspect of the disclosure, a method for monitoring a state of a physical passenger transport system using an updated digital double dataset is proposed. The latter comprises the characterizing properties of components of the physical passenger transport system in a machine-processable manner. The updated digital double dataset is made up of component model data records which include data which were determined by measuring characterizing properties on the physical passenger transport system after its assembly and installation in a building. In the following, the updated digital double dataset is referred to in abbreviated form throughout as "UDDD" for better readability.

Furthermore, the physical passenger transport system has a traveling conveyor belt and at least one detection device, the detection device detecting a load profile of the conveyor belt during operation of the passenger transport system. This load profile is transmitted as measurement data to the updated digital double dataset and, using a set of rules, characterizing properties of the component model data records affected by the transmitted measurement data are redetermined. The characterizing properties of the affected component model data records are then updated with the redetermined, characterizing properties.

This means that the method is based on the experience that, during operation, wear and tear occurs based on the load profile, in particular on moving components of the passenger transport system, and this wear and tear changes at least one characterizing property of at least one component model data record, and/or this characterizing property of the component model data record must be updated accordingly. As explained in greater detail below in connection with the figures, the detected changes usually relate to a plurality of characteristic properties of a plurality of component model data records. Each of these individual characteristic properties can be calculated for an affected component model data record from the detected load profile using a set of rules and the geometric relationships available in the updated digital double dataset, the physical properties stored in the component model data records, and known calculation methods from the fields of physics, mechanical engineering, and the science of strength of materials. The characterizing properties determined on the basis of the detected load profile now replace the corresponding, previous characterizing properties of the affected component model data records, so that the latter, or the updated digital double dataset, are updated.

After this, using the monitoring, changes and change trends in the updated characterizing properties of the traveling conveyor belt and their influence on the components of the conveyor belt and on the components interacting with these components can be tracked and evaluated using the updated digital double dataset by calculations and/or by static and dynamic simulations.

For evaluating, evaluation criteria associated with the characterizing properties of components, such as, for example, maximum chain elongation of conveyor chains, an upper limit for the power consumption by the driving engine, maximum and/or minimum dimensions at wear points, and the like may be present. These allow a simple comparison (static observation) of the changed characterizing property and specify, for example, the maximum permissible deviations based on target values. The characterizing properties of components of the updated digital double dataset can be compared with these evaluation criteria. Furthermore, using static simulations (for example, using finite element analysis, the decrease in strength due to material removal through wear) and dynamic simulations, the effects of the changed characterizing properties on the component in question and their effect on the components interacting with this component (e.g., increased freedom of movement or play due to the wear) can be evaluated.

According to a second aspect of the disclosure, a device for monitoring a state of a physical passenger transport system is proposed. It comprises an updated digital double dataset built from component model data records, which reproduces characterizing properties of components of the passenger transport system in an actual configuration of the physical passenger transport system in a machine-processable manner after the assembly and installation thereof in a building. In addition, the device has at least one detection device, by means of which a load profile of a conveyor belt of the passenger transport system can be detected during operation. This load profile can be transmitted to the updated digital double dataset as measurement data for the purpose of updating existing data, it being possible to redetermine characterizing properties of the component model data records affected by the transferred measurement data using a set of rules. The affected component model data records can then be updated with the redetermined, characterizing properties.

By means of static and dynamic simulations on the updated digital double dataset, the changes and change trends in the characterizing properties of the traveling virtual conveyor belt and their effects on virtual components of the passenger transport system interacting with said virtual components of the conveyor belt can be tracked and evaluated. Since most of the characterizing properties of the virtual components of the updated digital double dataset remain unchanged, and the updated characterizing properties based on the empirical values used result in a very accurate copy of the corresponding physical components of the physical passenger transport system, the calculations, findings, and evaluations for the virtual components are also valid almost 1:1 for the corresponding physical components of the physical passenger transport system.

According to a third aspect of the disclosure, a passenger transport system is proposed which comprises a device according to an embodiment of the second aspect.

According to a fourth aspect of the disclosure, a computer program product is proposed which comprises machine-readable program instructions which, when executed on a programmable device, cause the device to carry out or control a method according to an embodiment of the first aspect.

According to a fifth aspect of the disclosure, a computer-readable medium is proposed, on which is stored a computer program product according to an embodiment of the fourth aspect.

Possible features and advantages of embodiments of the disclosure may be considered, inter alia, and without limiting the disclosure, as being based on the ideas and findings described below.

As noted in the foregoing, until now passenger transport systems generally had to be inspected on-site in order to be able to detect whether maintenance or repair was currently necessary and, if so, what specific measures had to be taken, for example, which spare parts and/or tools were required.

In order to avoid this, it is proposed to use an updated digital double dataset for monitoring the characterizing properties determined on the basis of the load profile. The updated digital double dataset should comprise data which characterize the characterizing properties of the components forming the passenger transport system and provide, in its entirety, as complete a digital copy as possible of the physical passenger transport system assigned to the updated digital double dataset. The data of the updated digital double dataset should characterize the properties of the components in their actual configuration, e.g., in a configuration in which the components have been fully completed and then assembled to form the passenger transport system and installed in a building. Likewise, operational changes corresponding to the load profile are transmitted to the updated digital double dataset, so that the latter is updated to the current state of the assigned physical passenger transport system over the entire service life thereof.

In other words, the data contained in the updated digital double dataset do not merely reproduce target properties of the components, such as are assumed, for example, during planning, designing, and commissioning of the passenger transport system, and such as can be taken, for example, from CAD data used therein and relating to the components. Instead, the data contained in the updated digital double dataset are intended to reproduce the actual properties of the components installed in the fully assembled and installed passenger transport system. The updated digital double dataset can thus be considered to be a virtual copy of the finished passenger transport system or the components contained therein.

The data contained in the updated digital double dataset should reproduce the characterizing properties of the components in sufficient detail to be able to derive information therefrom about the current structural and/or functional properties of the physical passenger transport system. In particular, using the updated digital double dataset it should be possible to derive information about current structural and/or functional properties which characterize an updated state of the entire passenger transport system, it being possible to use this information to evaluate the current or future operational safety of the passenger transport system, the current or future availability thereof, and/or a current or future need for maintenance or repair thereof.

A particular advantage results from the use of the updated digital double dataset during the entire service life of the physical passenger transport system. That is, if the updated digital double dataset continues to be used, comprehensive documentation or updating of the data for the updated digital double dataset is required, since otherwise the operational monitoring, maintenance predictions, and determinations of state are based on incorrect data. This means that when components are replaced, the characterizing properties of the replacement parts must be detected digitally. During the maintenance work in the updated digital double dataset, the characterizing properties of the components removed are replaced by the characterizing properties of the replacement parts. Any adjustment measures must also be recorded and transmitted to the updated digital double dataset. In order to make the work easier for the fitters, the component measuring work and adjustments can be detected on-site using optical detection devices such as, for example, a laser scanner or TOF camera (time of flight camera). The data thereof are then automatically evaluated by a processing program, processed for the updated digital double dataset, and transmitted thereto.

The updated digital double dataset thus differs, for example, from digital data which are conventionally generated or used in the production of passenger transport systems. For example, when planning, designing, or commissioning a passenger transport system, it is common to use computers and CAD programs to plan or design the components used, so that corresponding CAD data reproduce, for example, a target geometry of a component. However, such CAD data do not indicate what geometry a produced component actually has, wherein, for example, production tolerances or the like can lead to the actual geometry differing significantly from the target geometry.

In particular, conventionally used data such as CAD data do not indicate which characterizing properties components have assumed after they have been assembled to form the passenger transport system and installed in a building. Depending on how the assembly and installation were performed, there may be significant changes in the characterizing properties of the components compared to the originally designed target properties thereof and/or compared to the properties thereof immediately following production but prior to assembly and installation.

The updated digital double dataset is also distinguished from data as they are conventionally used in part during production of complex workpieces and machines. For example, DE 10 2015 217 855 A1 describes a method for checking consistency between reference data of a production object and data of a so-called digital twin of the production object. A digital copy of a workpiece, referred to as a digital twin, is synchronized with the state of the workpiece during production. For the production process, this means that after each production step the data reproducing the digital twin are modified such that the changes in the properties of the workpiece to be brought about by the production step are to be taken into account.

For example, it can be provided in a production step to remove a region of the workpiece by grinding, turning, or the like in accordance with target specifications so that, after the production step has been carried out, the digital twin is also modified in accordance with the target specifications. In this way, the digital twin should always provide information about the current intermediate state of the workpiece during the production thereof.

However, particularly in the production of components for passenger transport systems, DE 10 2015 217 855 A1 does not provide for taking into account in the digital twin data which reproduce the actual characterizing properties of the components, in particular actual characterizing properties of the components after assembly thereof to form a completed passenger transport system and installation thereof in the building. Instead, the data in the digital twin are mostly based exclusively on target properties such as can be reproduced, for example, in the form of CAD data.

In order to be able to monitor the state of a passenger transport system with sufficient accuracy and/or reliability, or possibly even to forecast said state, it is now proposed to provide the data used for this purpose in the form of the updated digital double dataset. The updated digital double dataset provides information that is about the characterizing properties of the components installed in the passenger transport system in their actual configuration, and this information extends beyond mere target properties and is continuously or periodically compared to the physical passenger transport system and updated. Such information can advantageously be used, for example, to be able to detect deviations in the actual characterizing properties from originally designed characterizing properties of the passenger transport system. It is possible to infer from such deviations, for example, whether there is already a need for maintenance or repair of the passenger transport system, whether there is a risk of increased or premature wear, etc. For example, the deviations can arise from production tolerances that occur during the production of the components, from changes in the characterizing properties of the components during the assembly of the components or during the installation thereof in the building, and/or from changes in the characterizing properties of the components that occur during the final operation of the passenger transport system, said changes resulting, for example, from wear. The load profile detected by the detection device can be used to measure the wear.

In one embodiment, the load profile detected by the detection device can represent the drive power generated by the driving engine over the operating time and can be calculated and created from the detected current curve and voltage curve of the driving engine, taking into account the driving engine temperature. The drive power of the driving engine, which it consumes over time, represents the loss of frictional energy of the moving physical components as well as the potential energy that has been released to the users of the passenger transport system over time. The disclosure is based on the knowledge that the drive power consumed over time is also an excellent indicator of the wear and tear on the conveyor belt. To create the load profile, a separate calculation routine can be stored in the set of rules, which calculates the power consumed and, in the case of recuperation, also the power output over time as a power curve. This performance curve can be called up by a supervisor or service technician of the system via a suitable interface (for example, a computer) and displayed on his screen. As stated above, the load profile forms the basis on which the characterizing properties of the individual component model data records are updated using the set of rules.

This detected load profile can be examined for periodically occurring peaks using the set of rules, whereby when peaks occur these can be assigned to a point on the conveyor belt. Such periodically occurring peaks are a strong indication that there is a defect at the assigned point on the conveyor belt, for example, a breakage or bearing damage of a step roller or chain roller, a break in the step axle, and the like. Since the data is transmitted to the updated digital double dataset and each physical component is mapped as a virtual component in the updated digital double dataset, the assignment can be made on the updated digital double dataset.

In a further embodiment, the detection device can be a radar sensor or a light barrier, which detects passengers who enter the passenger transport system. The detected passengers are, for example, converted into a load profile using load analyses stored in the set of rules with an average, assumed mass (for example, 85 kg). This load profile can also be displayed on a screen as described above.

In a further embodiment, the detection device can be a load sensor arranged in the physical passenger transport system, by means of which loads are directly detected that are conveyed by the passenger transportation system, with these being converted into a load profile.

It is of course possible for the passenger transport system to have a plurality of the detection devices described above. Their measured values can also be combined and/or compared with one another using the set of rules in order to arrive at a more precise load profile.

The load profile can be added up or integrated into a load sum over the entire operating time using the set of rules. Corresponding wear values based on empirical values can be extracted from this load sum for the component model data records affected by the load profile. With these wear values, based on the characterizing properties determined by measurements on the physical passenger transport system after its assembly and installation in a building, the new characterizing properties intended for updating can then be determined.

It is clear from the foregoing designs that the set of rules is not a simple formula, but rather a comprehensive computer program or part of a computer program of updated digital double dataset. For example, a database with wear values can be stored in the set of rules, but a large number of algorithms, calculation methods from the field of physics, technical mechanics and strength theory, and stochastic calculation methods can also be implemented. The set of rules can of course also contain an access control to external computer programs and databases in which these algorithms and calculation methods are implemented. The individual component model data records preferably contain which calculation bases from the set of rules are used for its characteristic properties.

Due to the fact that the updated digital double dataset, as a virtual digital copy of the actual passenger transport system, allows inferences to be made about the characterizing properties currently prevailing in the passenger transport system, in the best case, information which allows inferences to be made about the current state of the passenger transport system and in particular about any maintenance or repair that may be necessary can be obtained solely by analyzing and/or processing the updated digital double dataset. It is even possible to derive information about which spare parts and/or tools are needed for upcoming maintenance or repair.

The updated digital double dataset can be stored, analyzed, and/or processed in a computer configured for carrying out the method proposed here or in a corresponding data processing system. In particular, the computer or the data processing system can be arranged remotely from the passenger transport system to be monitored, for example, in a remote monitoring center.

Accordingly, the use of the updated digital double dataset makes it possible to monitor remotely, continuously or at suitable time intervals, properties characterizing the state of the physical passenger transport system, in particular to detect changes that make maintenance or repair seem necessary. If necessary, specific information based hereon regarding work to be carried out during maintenance or repair can be derived in advance, based solely on an analysis of the updated digital double dataset, without a technician actually having to inspect the passenger transport system on-site. This can considerably reduce effort and costs involved.

According to one embodiment, the measurement data transmitted by the detection device and/or the characterizing properties determined therefrom can be stored with time information in a log file. This has the advantage, on the one hand, that a data history is available from which, for example, special events can be read out, such as instantaneous excessive force due to improper use or due to external influences such as seismic impacts and the like.

On the other hand, the time information in the log file is also used to correctly determine the characterizing properties of the components affected. As long as no maintenance has been carried out after the start-up of the physical passenger transport system, the same load profile is used for all virtual components of the assigned updated digital double dataset as the basis for determining their affected, characterizing properties. If, however, a wearing part is replaced during maintenance work, then the load profile for its virtual component model data record is only added up from the replacement time.

Furthermore, a change trend in the measured values can be determined using statistical methods using the measurement data and/or characterizing properties stored in the log file and operating data stored in the log file. Operating data are data that arise during the operation of a passenger transport system, for example, total operating time, driving engine power consumption, ambient temperature, operating temperature, and the like. The information gained through operating data can be used in many ways. If the change trend is linear, it is quite simple to predict the end of service life for the affected component due to constant wear. If the change trend drifts downward, this indicates a running-in behavior and thus an increasingly stable state of the component affected. Increased signs of wear can be diagnosed when there is an upward drift in the change trend. Additional advantages are listed below.

The measured values can be transmitted continuously, periodically and/or as a function of the change trend for the measured values. If there is a relationship with the change trend, this means that a fixed period can be selected if the change trend is linear. With a decreasing tendency, the period can be increasingly extended, whereas with an increasing tendency, the period between two measurements can be shortened.

The wear-related characterizing properties of the physical components to be taken into account when updating the updated digital double dataset can be geometric dimensions of the component, the weight of the component, and/or the surface quality of the component. Geometric dimensions of the components can be, for example, a length, width, height, cross-section, radii, fillets, etc. of the components. The surface quality of the components can comprise, for example, roughnesses, textures, coatings, colors, reflectivities, etc. of the components.

The characterizing properties can relate to individual components or component groups. For example, the characterizing properties can relate to individual components from which larger, more complex component groups are composed. As an alternative or in addition, the properties can also relate to more complex devices composed of a plurality of components, such as driving engines, gear units, conveyor chains, etc.

The characterizing properties can be determined or measured with high precision prior to the start-up. In particular, the characterizing properties can be determined or surveyed with a precision that is more precise than the tolerances to be observed during the production of the components.

According to another embodiment, monitoring the state of the physical passenger transport system also includes simulating future characterizing properties of the passenger transport system using the updated digital double dataset.

In other words, not only should the properties currently prevailing in the passenger transport system be monitored using the updated digital double dataset, but also it should be possible to make inferences about the characterizing properties that will prevail in the passenger transport system in the future using simulations to be carried out using the updated digital double dataset.

The simulations can be carried out on a computer system. Using the simulations, it is possible to make inferences about a temporal development in the represented characterizing properties, and thus make forecasts or extrapolations relating to future characterizing properties of the components, proceeding from data currently contained in the updated digital double dataset and, if appropriate, taking into account data previously contained in the updated digital double dataset. In simulations, it is possible to take into account natural law conditions as well as experience with other passenger transport systems.

For example, simulations can take into account how, for example, wear-related changes in the characterizing properties of components have an effect on further changes in these characterizing properties that are expected in the future. As an alternative or in addition, the simulations can take into account experiences gained from experiments and/or by observing other passenger transport systems and from which, for example, a statement can be derived as to when a change in the characterizing properties of a component that has occurred or is expected in the future for the function of the entire passenger transport system should be regarded as substantial, so that suitable measures should be initiated, for example, as part of maintenance or repair.

It is also possible to develop and test new, improved physical components and in particular control components (hardware and software) with the help of the updated digital double dataset. According to the hardware-in-the-loop approach, the component model data record of a component to be tested can be deactivated in the updated digital double dataset and can be connected to the component to be tested via suitable interfaces.

The suitable interface can be a test bench adapted to the mechanical and/or electrical interfaces of the physical component and connected to a computer system having the updated digital double dataset. In other words, in accordance with the hardware-in-the-loop approach, an embedded system (e.g., real electronic control unit or real mechatronic component, the physical component or the physical component group) is thus connected via its inputs and outputs to the updated digital double dataset, the updated digital double dataset acting as a replica of the real environment of the system or of the entire escalator or the entire moving walkway. In this way, the updated digital double dataset can safeguard embedded systems, provide support during development, and contribute to early start-up of machines and systems from the perspective of the test.

Another advantage of the updated digital double dataset is its inherent systems engineering approach. The focus of systems engineering is to meet the customer's requirements for the system to be delivered, which requirements are included in the specification, within the cost and time frame in that the system is broken down into and specified as subsystems, devices and software, and, secondly, implementation across all levels is monitored until delivery is made to the customer. The entire problem (operation, costs, schedule, performance, training and support, testing, production and recycling) should be taken into account. Systems engineering integrates all of these engineering disciplines and skills into a uniform, team-oriented, structured process which, depending on the complexity of the system, can extend over a plurality of levels to a device of a subcontractor. This process is used from conception to production to operation and in some cases to dismantling or recycling. By mapping all physical components as component model data records with all their characterizing properties and interface information—combined and constantly updated in the updated digital double dataset— this offers an excellent system engineering platform to meet the customer's requirements in the shortest possible time for the deliverable escalator or moving walkway beyond the installation of the physical product.

In particular, the method proposed herein can further comprise planning maintenance work to be carried out on the passenger transport system based on the monitored properties of the passenger transport system.

In other words, the information obtained when monitoring the properties of the passenger transport system according to the disclosure can be used in order to be able to appropriately plan future maintenance work, including any necessary repairs. It can be of advantage here that valuable information can be obtained just by analyzing the updated digital double dataset, for example, information about what changes have occurred in a monitored passenger transport system and/or what wear on components of the passenger transport system must actually be expected. This information can be used to be able to plan for maintenance work, for example, with regard to a time of maintenance and/or with regard to activities to be carried out during maintenance and/or with regard to spare parts or tools to be kept available during maintenance, and/or with regard to technicians performing the maintenance who may need to have special skills or knowledge. In most cases, planning for the maintenance work can take place purely based on analysis of the updated digital double dataset, e.g., without a technician having to inspect the passenger transport system on-site.

According to one embodiment of the present disclosure, the proposed monitoring method also comprises creating the updated digital double dataset. The creation of the updated digital double dataset comprises at least the following steps, but preferably not strictly in the order given:

(i) creating a commissioning digital double dataset with target data which reproduce characterizing properties of components of the passenger transport system in a target configuration;

(ii) creating a production digital double dataset based on the commissioning digital double dataset by measuring actual data which reproduce characterizing properties of components of the passenger transport system in the actual configuration of the passenger transport system immediately after the assembly and installation thereof in a building and replacing target data in the commissioning digital double dataset with corresponding actual data; and, (iii) creating the updated digital double dataset based on the production digital double dataset by updating the production digital double dataset during the operation of the physical passenger transport system, taking into account the load profile detected by the detection device, wherein the characterizing properties of component model data records to be updated, in particular of the conveyor belt, are determined from the detected load profile using the set of rules.

In other words, the updated digital double dataset can be created in a plurality of sub-steps. The data contained in the data record can be successively improved and refined so that the characterizing properties of the components installed in the passenger transport system are reproduced more and more precisely with regard to their actual current configuration with continuous creation.

However, the commissioning digital double dataset described above is not simply available "off the shelf." According to another embodiment, creating the commissioning digital double dataset includes preliminary creation of a digital double dataset taking into account customer-specific configuration data and creating production data by modifying the digital double dataset taking into account production-specific data.

In other words, both customer-specific configuration data and production-specific data should be taken into account when initially creating the commissioning digital double dataset. As a rule, a digital double dataset is first created from component model data records, taking into account the customer-specific configuration data, and then this digital double dataset is modified or refined, taking into account the production-specific data. Creating the commissioning digital double dataset can also possibly include numerous iterative calculations and modifications to data from the digital double dataset, taking into account customer and/or production specifications.

Customer-specific configuration data can be understood to mean specifications which are specified by the customer in individual cases, for example, when ordering the passenger transport system. The customer-specific configuration data typically relate to a single passenger transport system to be produced. For example, the customer-specific configuration data can comprise prevailing spatial conditions at the installation location, interface information for attaching to supporting structures of a building, etc. In other words, the customer-specific configuration data can specify, for example, how long the passenger transport system should be, what height difference is to be overcome, how the passenger transport system should be connected to supporting structures within the building, etc. Customer-specific configuration data can also include customer wishes with regard to functionality, conveying capacity, optics, etc. The data for the digital double dataset can be present, for example, as a CAD data record which, inter alia, reproduces geometric dimensions and/or other characterizing properties of the components forming the passenger transport system as characterizing properties.

The production-specific data typically relate to properties or specifications within a manufacturing plant or production line in which the passenger transport system is to be manufactured. For example, depending on the country or location in which a production factory is located, various conditions may exist in the production factory and/or various requirements may have to be met. For example, in some production factories certain materials, raw materials, raw components or the like may not be available or may not be processed. In some factories, machines can be used that are not available in other factories. Due to their layout, some factories are subject to restrictions with regard to the passenger transport systems or components thereof to be produced. Some production factories allow a high degree of automated production, whereas other production factories use manual production, for example, due to low labor costs. There may be a multitude of other conditions and/or requirements for which production environments can differ. All of these production-specific data typically have to be taken into account when planning or commissioning a passenger transport system, since these data may have a critical role in how a passenger transport system can actually be built. It may be necessary to fundamentally modify the initially created digital double dataset, which only took into account the customer-specific configuration data, in order to be able to take the production-specific data into consideration.

Static and/or dynamic simulations are preferably carried out when the digital double dataset is created, and the commissioning digital double dataset is created taking results of the simulations into account. One of these dynamic simulations can be, for example, a starting behavior for an escalator. In this case, all friction forces as well as clearances and the properties dependent on the driving engine are simulated, from standstill to nominal speed. With these simulations, points critical to collision can be checked and the dynamic forces acting on the individual components or component model data records can be determined during the start-up.

In other words, for creating the digital double dataset, which, taking into account the customer-specific configuration data, forms the basis of the commissioning digital double dataset, simulations can be performed with which static and/or dynamic properties of the commissioned passenger transport system are simulated. Simulations can be performed in a computer system, for example.

Static simulations analyze, for example, a static interaction of a plurality of assembled components. With the help of static simulations, it is possible to analyze, for example, whether complications can arise during assembly of a plurality of predefined components or components specified appropriately based on component model data records, for example, because each of the components is manufactured with certain manufacturing tolerances so that there can be problems if the sum of manufacturing tolerances is unfavorable.

Dynamic simulations, for example, analyze the dynamic behavior of components during the operation of the assembled passenger transport system. Using dynamic simulations, for example, it is possible to analyze, for example, whether moving components, especially the traveling components, within a passenger transport system can be moved in a desired manner or whether there is a risk of collisions between components moving relative to one another.

From the foregoing, it can be seen that initially only target data based on the data determined when planning and commissioning the passenger transport system are stored in the commissioning digital double dataset. These target data can be obtained, inter alia, if, for example, computer-assisted commissioning tools are used to calculate the characterizing properties of a passenger transport system to be produced, depending on customer specifications. For example, data relating to target dimensions, target numbers, target material properties, target surface quality, etc. of components to be used in the production of the passenger transport system can be stored in the commissioning digital double dataset.

The commissioning digital double dataset thus represents a virtual copy of the passenger transport system in its planning phase or commissioning phase, that is, before the passenger transport system is actually produced and installed using the commissioning digital double dataset.

Proceeding from the commissioning digital double dataset, the target data contained therein can then be successively replaced by actual data as production progresses, and a production digital double dataset can be generated. The actual data indicate characterizing properties of the components of the passenger transport system, initially only defined with regard to their target configuration, in their actual configuration immediately after assembly and the installation of the passenger transport system in the building. The actual data can be determined by manual and/or mechanical surveying of the characterizing properties of the components. Separate measuring devices and/or sensors integrated in components or arranged on components can be used for this purpose.

The production digital double dataset thus represents a virtual copy of the passenger transport system immediately after completion thereof, e.g., after the assembly of the components and the installation in the building.

During the start-up of the physical passenger transport system, its production digital double dataset in the updated digital double dataset is supplemented with the occurring operating data and operating adjustment data. During the subsequent operation of the passenger transport system, the updated digital double dataset is updated continuously or at suitable intervals. For this purpose, the data initially stored in the updated digital double dataset are modified during operation of the passenger transport system such that changes calculated on the basis of the load profile in the characterizing properties of the components forming the passenger transport system are taken into account.

Changes occurring over time in the measured values supplied by the detection device indicate changes in the observed characterizing properties, so that the data contained in the updated digital double dataset can be calculated and modified accordingly. The updated digital double dataset modified in this way thus represents a virtual copy of the passenger transport system during the operation thereof and taking into account, for example, wear-related changes in comparison to the characterizing properties originally measured immediately after completion, and can thus be used as updated digital double dataset for continuous or repeated monitoring of the properties of the passenger transport system.

Logically, not all of the characterizing properties of a component that are present as target data must necessarily be updated by actual data of the component or by the characterizing properties calculated on the basis of the load profile. As a result, the characterizing properties of most components of a production digital double dataset and of the resultant updated digital double dataset are characterized by a mixture of target data, actual data, and calculated data.

Specific embodiments of how an updated digital double dataset can be created for an escalator or moving walkway and how the state of the escalator or moving walkway can be monitored based thereon are set out below, referencing preferred embodiments.

Embodiments of the method presented herein for monitoring the state of a passenger transport system can be performed using a device specially configured for this purpose. The device can comprise one or more computers. In particular, the device can be formed from a computer network which processes data in the form of a data cloud. For this purpose, the device can have a storage device in which the data of the updated digital double dataset can be stored, for example, in electronic or magnetic form. The device can also have data processing options. For example, the device can have a processor which can be used to process the data in the updated digital double dataset. The device can furthermore have interfaces via which data can be input into and/or output from the device. In particular, the device can have a detection device which is arranged on or in the passenger transport system and with the aid of which a load profile of the conveyor belt can be recorded. The device can in principle be part of the passenger transport system. However, the device is preferably not arranged in the passenger transport system, but rather remote from it, for example, in a remote control center from which the state of the passenger transport system is to be monitored. The device can also be implemented in a spatially distributed manner, for example, if data are processed in a data cloud and distributed over a plurality of computers.

In particular, the device can be programmable, that is, it can be caused by a suitably programmed computer program product to execute or control the inventive method. The computer program product can contain instructions or code which, for example, cause the processor of the device to store, read, process, modify, etc. data of the digital double dataset. The computer program product can be written in any computer language.

The computer program product can be stored on any computer-readable medium, for example, a flash memory, CD, DVD, RAM, ROM, PROM, EPROM, etc. The computer program product and/or the data to be processed therewith can also be stored on a server or a plurality of servers, for example, in a data cloud, from where these data can be downloaded via a network, for example, the internet.

Finally, it is pointed out that some of the possible features and advantages of the disclosure are described herein with reference to different embodiments of both the proposed method and the correspondingly configured device for monitoring properties of a passenger transport system. A person skilled in the art recognizes that the features can be combined, transferred, adjusted, or exchanged in a suitable manner in order to arrive at further embodiments of the disclosure.

BRIEF DESCRIPTION OF THE DRAWINGS

Embodiments of the disclosure will be described in the following with reference to the accompanying drawings, wherein neither the drawings nor the description are intended to be interpreted as limiting to the disclosure.

The figures are merely schematic and are not true to scale. Identical reference numbers designate identical or equivalent features in the various figures.

DETAILED DESCRIPTION

Figure 1:
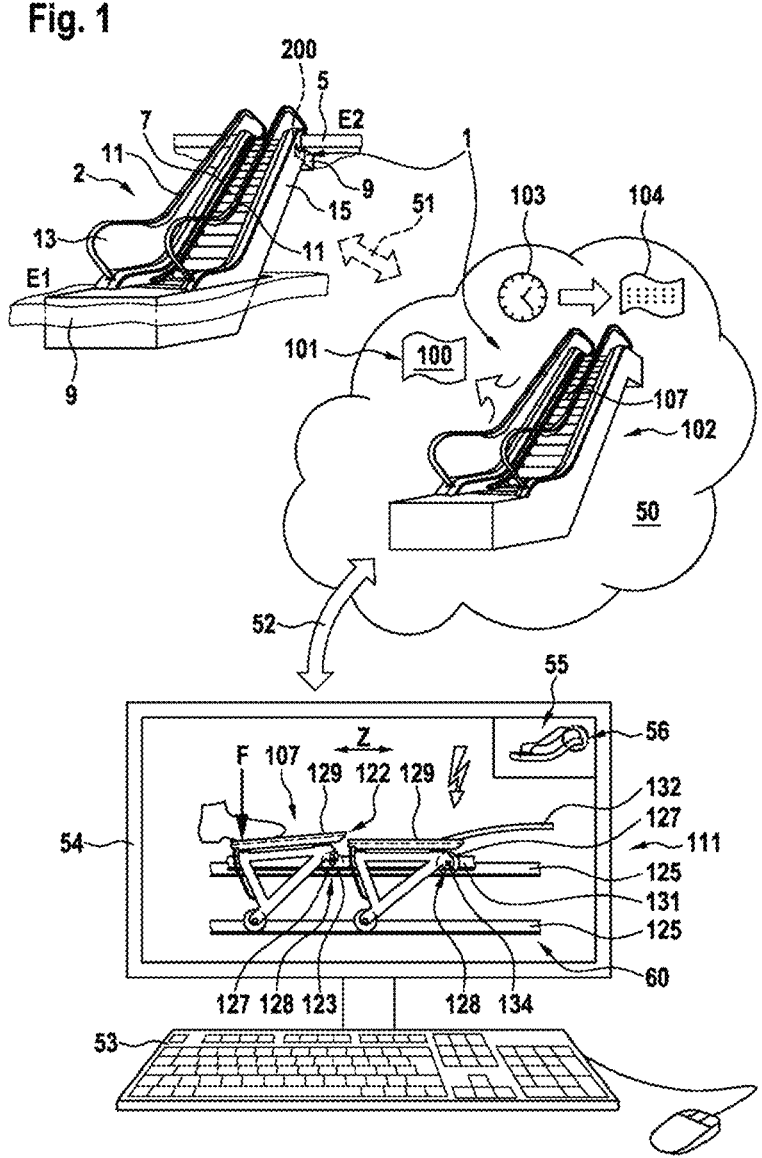
FIG. 1 illustrates an inventive apparatus comprising a detection device arranged in a physical passenger transport system, and an updated digital double dataset (UDDD) which depicts the physical passenger transport system and is stored in a data cloud and with which device the inventive method can be carried out.

FIG. 1 illustrates a device 1 according to the disclosure comprising a detection device 200 which is arranged in a physical passenger transport system 2 and an updated digital double dataset (UDDD) 102 of the physical passenger transport system 2, which is stored in a data cloud (cloud) 50, wherein a method 100 according to the disclosure can be carried out using the device 1.

The physical passenger transport system 2 illustrated in FIGS. 1 and 2 (described together below) is configured in the form of an escalator and connects levels E1 and E2, which are at different elevations and spaced horizontally apart from one another in a building 5. The physical passenger transport system 2 can be used to transport passengers between the two levels E1 and E2. The physical passenger transport system 2 is supported at its opposing ends on support points 9 of the building 5.

Figure 2:
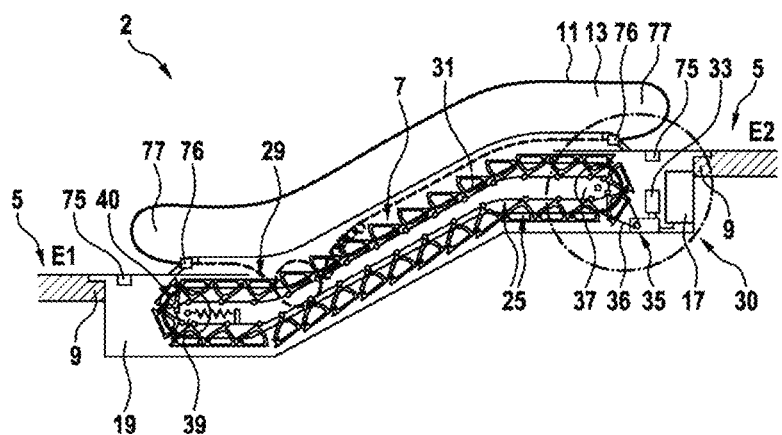
FIG. 2 is a sectional side view of the escalator from FIG. 1.

The physical passenger transport system 2 further comprises a support structure 19, shown only in its outline in FIG. 2, which receives all other components of the physical passenger transport system 2 in a load-bearing manner. These include statically arranged physical components such as guide rails 25, a driving engine 33, a drive train 35, a control unit 17, drive sprockets 37 driven by the driving engine 33 via the drive train 35, and a deflection curve 39. The physical passenger transport system 2 further comprises balustrades 13 arranged above and on the support structure 19 on its two longitudinal sides. The deflection curve 39 is part of a conveyor chain tensioning device 40.

Furthermore, the physical passenger transport system 2 also has traveling components 7, 11, 31, 36 which are naturally subject to wear during operation. These are, in particular, a conveyor belt 7, which is arranged traveling between the drive sprockets 37 and the deflection curves 39, two handrails 11 or handrail belts, which are arranged traveling on the balustrades 13, and a drive chain 36, which is part of the drive train 35 as a transmission member. The conveyor belt 7 comprises escalator steps 29 and conveyor chains 31 as well as a number of further components such as step rollers, chain rollers, step axles, and the like.

Alternatively, the physical passenger transport system 2 can also be configured as a moving walkway (not shown) constructed similar or identical to an escalator 2 in terms of many of its components.

As FIG. 1 illustrates, many components of the physical passenger transport system 2, such as the panel wall 19, guide rails 25, the entire drive train 35, the drive sprockets 37 and deflection curves 39, the electrical equipment such as power and signal lines, sensors, and the control unit 17, are covered and protected using trim components 15 and are therefore not visible from the outside. Only part of the escalator steps 29 of the advance that can be accessed by passengers is visible for the conveyor belt 7 in FIG. 1, as well.

According to FIG. 1, the device 1 also comprises an updated digital double dataset 102, referred to as UDDD 102 in the following for better readability. The updated digital double dataset 102 is a virtual copy that is as comprehensive as possible and tracks the current physical state of the physical passenger transport system 2 and therefore represents a virtual passenger transport system assigned to the physical passenger transport system 2. This means that the updated digital double dataset 102 is not just a virtual envelope model of the physical passenger transport system 2, roughly representing its dimensions, but also includes and reproduces in digital form in the updated digital double dataset 102 every single physical component, from the handrail 11 to the last screw, with as many of its characterizing properties as possible.

According to the disclosure, characterizing properties of components can be geometric dimensions of the components, such as, for example, a length, width, height, cross-section, radii, fillets, etc. The surface quality of the components, such as, for example, roughness, textures, coatings, colors, reflectivities, etc., are also characterizing properties. Furthermore, material values such as, for example, the modulus of elasticity, bending fatigue strength, hardness, notched impact strength, tensile strength, etc., can also be stored as characterizing properties of each component. These are not theoretical properties (target data) such as those found on a production drawing, but rather characterizing properties actually determined on the physical component (actual data). Information relevant to assembly, such as the actually applied tightening torque for a screw, and thus its pretensioning force, is preferably assigned to each component.

The device 1 can comprise one or a plurality of computer systems 111, for example. In particular, the device 1 can comprise a computer network which stores and processes data in the form of a data cloud 50 (cloud). For this purpose, the device 1 can have a storage element or, as shown symbolically, storage resources in the data cloud 50 in which the data of the updated digital double dataset 102 (symbolically illustrated as a three-dimensional copy of the physical passenger transport system 2) can be stored, for example, in electronic or magnetic form. This means that the updated digital double dataset 102 can be stored in any storage location.

The device 1 can also have data processing options. For example, the device 1 can have a processor that can be used to process the data in the updated digital double dataset 102. The device 1 can furthermore have interfaces 53, 54 via which the data can be input into the device 1 and/or output from the device 1. In particular, the device 1 can have internal interfaces 51, 52, wherein the interface 51 between the updated digital double dataset 102 and the physical passenger transport system 2 allows communication with the detection device 200 which is arranged on or in the passenger transport system 2 and with which characterizing properties of components of the passenger transport system 2 can be measured and determined directly or indirectly.

In principle, the device 1 can be implemented in its entirety in the physical passenger transport system 2, wherein the updated digital double dataset 102 thereof is stored, for example, in control unit 17 thereof and the data of the updated digital double dataset can be processed by the control unit 17. However, the updated digital double dataset 102 of the device 1 is preferably not stored in the physical passenger transport system 2, but instead remote therefrom, for example, in a remote control center from which the state of the physical passenger transport system 2 is to be monitored or in which a data cloud 50 can be accessed from anywhere, for example, via an internet connection. The device 1 can also be implemented in a spatially distributed manner, for example, when data of the updated digital double dataset 102 are processed in a distributed manner in the data cloud 50 via a plurality of computers.

In particular, the device 1 can be programmable, that is to say it can be caused to execute or control the inventive method 100 using a suitably programmed computer program product 101 comprising the updated digital double dataset 102. The computer program product 101 can contain instructions or code which, for example, cause a processor of the device 1 to store, read, process, modify, etc., data of the updated digital double dataset 102 according to the implemented method 100. The computer program product 101 can be written in any computer language.

The computer program product 101 can be stored on any computer-readable medium, for example, a flash memory, CD, DVD, RAM, ROM, PROM, EPROM, etc. The computer program product 101 and/or the data to be processed therewith can also be stored on a server or a plurality of servers, for example, in the data cloud 50, from where these data can be downloaded via a network, for example, the internet.

Based on the data available in the updated digital double dataset 102, the latter or its virtual components can be called up by executing the computer program product 101 in a computer system 111 and represented as a three-dimensional, virtual passenger transport system. The latter can be "walked through" and explored virtually using zoom functions and movement functions. Movement sequences, collision simulations, static and dynamic strength analyses using the finite element method, and interactive queries on current characterizing properties of individual virtual components and component groups are also possible. This means that, for example, the virtual traveling conveyor belt 107, which is the counterpart of the physical conveyor belt 7, is selected from the updated digital double dataset 102 and its updated, characterizing property, such as a wear-related change in length, can be queried in comparison to the new state.

In order for it to be possible for meaningful state analyses and state simulations to be carried out using the updated digital double dataset 102, in particular the characterizing properties of components subject to wear must be updated continuously or periodically in the virtual component data records of the updated digital double dataset 102. These update queries can be initialized automatically using the method 100 implemented in the computer program product 101. However, they can also be initialized from "outside," e.g., via an input, for example, via the interface 53 of the computer system 111 illustrated as a keyboard. The actual updating of the characterizing properties takes place via the interface 51 between the physical passenger transport system 2 and the updated digital double dataset 102 or the running computer program (method 100) of the computer program product 101. In this case, measured values from corresponding sensors or sensor systems of the detection device 200 (see also FIGS. 3 and 4) are queried and these measured values are optionally further processed in order to arrive at the characterizing properties of the components influenced or affected by the measured value. The measured values and the resulting characterizing properties can be stored in a log file 104. In order to sort these entries historically, said entries can be stored in the log file 104 with time information 103. The acquisition of measured values and their further processing in order to arrive at characterizing properties of the components influenced or affected by the measured value is explained in greater detail below in connection with FIG. 3 through 5.

As illustrated schematically in FIG. 1, a user, for example, a technician, can query the state of the physical passenger transport system 2 by starting or accessing the computer program 100 of the computer program product 101 via the computer system 111. The computer system 111 can be a fixed component of the device 1, but it can also assume only a temporary association while it is used to access data from the updated digital double dataset 102 via the interface 52.

In the present exemplary embodiment in FIG. 1, the technician selected a region 60 of the updated digital double dataset 102 via zoom functions. A small navigation graphic 55 can be displayed on the screen 54 which acts as data output and on which the selected region 60 is indicated using a pointer 56. The selected region 60 is the virtual access region available in the level E2, the virtual escalator steps 129 moving under the virtual comb plate 132 arranged there. Because the region 60 has been zoomed in on, only the virtual guide rails 125, the virtual comb plate 132, and two virtual escalator steps 129 of the conveyor belt 107 can be seen.

Since the physical conveyor belt 7 has already been in operation for a few operating hours, the articulation points of its conveyor chains exhibit a certain amount of wear as a result of the constant relative movements between the chain links under load. This wear leads to an elongation of the conveyor belt 7, so that the gap between two escalator steps 29 can become slightly larger. The wear-related elongation of the conveyor belt 7 can be determined as further below in connection with FIGS. 3 to 5 from the measured values for the power consumption (current and voltage curve over time) or the load profile of the driving engine 33 and transmitted to the updated digital double dataset 102 in that the corresponding characterizing properties are updated for the virtual components affected. When the measured values of the load profile with all the resulting effects on the affected components have been transmitted to the updated digital double dataset 102, the components of the virtual conveyor belt 107 as well as the articulation points 128 of its conveyor chains 131 have the same wear-related changes, so that the gap between two virtual escalator steps 129 becomes slightly larger in the updated digital double dataset 102, as well.

Specifically, this means that the changes detected from the determined load profile mean an extension of the conveyor chain 131 or a change in the play in each articulation point 128. Depending on the strength properties of the chain pin 134 and the chain bushing 123 of the articulation point 28, this play is divided, for example, between the inner diameter of the chain bushing 123 and the outer diameter of the chain pin 134. As a result, the characterizing property "inner diameter" of the chain bushing 123 and the characterizing property "outer diameter" of the chain pin 134 of each articulation point 128 of the conveyor chains 131 change.

From this, for example, strength calculations can be carried out for the chain pins 134, so that the current safety factor of the virtual conveyor chain 131 and thus of the physical conveyor chain 31 against breakage can also be determined in the course of the analysis to be carried out according to the inventive method 100.

However, the wear described above leads not only to a weakening of the chain pin 134, but also to greater play within the articulation points 128. The effects of this greater play can be evaluated using dynamic simulations on the updated digital double dataset 102. In these simulations, for example, the virtual escalator step 129 can move orthogonally to the provided direction of movement Z within this play (extremely exaggerated in FIG. 1) and, when the load F is unfavorable for this case, can tilt somewhat more than the normal play between the virtual chain rollers 127 and the virtual guide rails 125 would allow. If the play is too large and the tilt is too great, the leading edge 122 of the virtual escalator step 129 can collide with the virtual comb plate 132. The same is logically to be feared with the physical passenger transportation system 2, which is why maintenance of the physical passenger transport system 2 should be initiated immediately on the basis of the simulation results described above.

As already mentioned above, the measured values detected by the detection device 200 can be provided with time information 103 and stored in a log file 104. Of course, the same can also be done with the characterizing properties of the virtual components of the updated digital double dataset 102, so that a traceable history is also available for the characterizing properties and a change trend for the corresponding characterizing properties can be calculated based on this history using known analytical methods. Using suitable extrapolation based on the history, the time of a possible damage event can be determined and preventive maintenance can be planned and carried out before this time. In the example described above, the remaining time can be extrapolated using the decrease in diameter of the chain pin 134 as a result of wear until there is a drop below the prescribed safety factor for the chain pin 134. Likewise, a possible point in time for a step collision with the comb plate 132 can be determined using the dynamic simulation described above, the earlier possible point in time of the two events determining the time for maintenance.

In order to limit the amount of data that occurs, a traceable history can also be created with only a few selected characterizing properties of a few selected components that are particularly subject to signs of wear.

For reasons of the manufacturing tolerances of the components and due to the settings made during the manufacture and/or start-up and/or during prior maintenance, not every physical passenger transport system 2 has the exact same geometric relationships with regard to the components and their installation position. Strictly speaking, each physical passenger transport system is unique in the totality of the characterizing properties of its components and accordingly all updated digital double datasets 102 differ (even if only slightly) from one another. In the region 60 selected by way of example, this leads to the fact that a certain sign of wear (quantitatively the same, on a specific component) can lead to a collision of escalator step 29 and comb plate in one physical passenger transport system 2, while in another physical passenger transport system 2 of the same design there is no risk of a collision for quite some time. This example makes it easy to see that, for each physical component of a passenger transport system 2—based on the analysis options which the updated digital double dataset 102 offers with its virtual components— the further use thereof, the adjustment in the environment thereof, or the replacement thereof can determined using the updated digital double dataset 102, and appropriate maintenance work can be planned.

Figure 3:
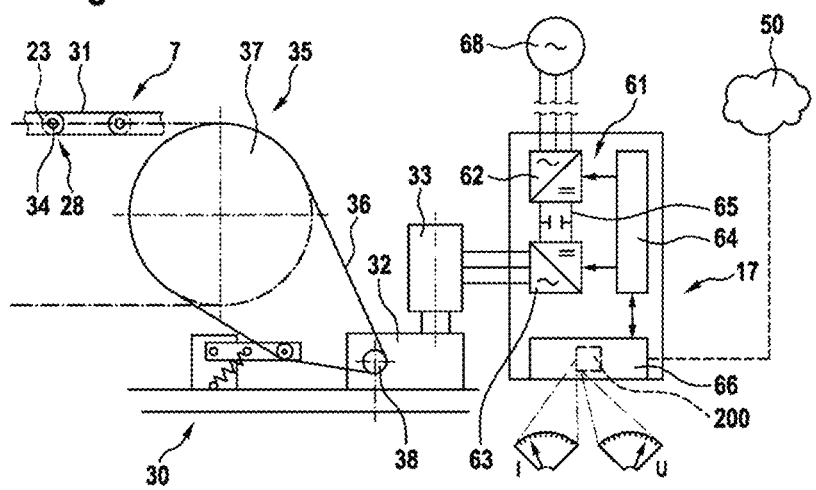
FIG. 3 is an enlarged representation of the region indicated in FIG. 2, showing the detection device arranged in this region being shown in greater detail.
Figure 4:
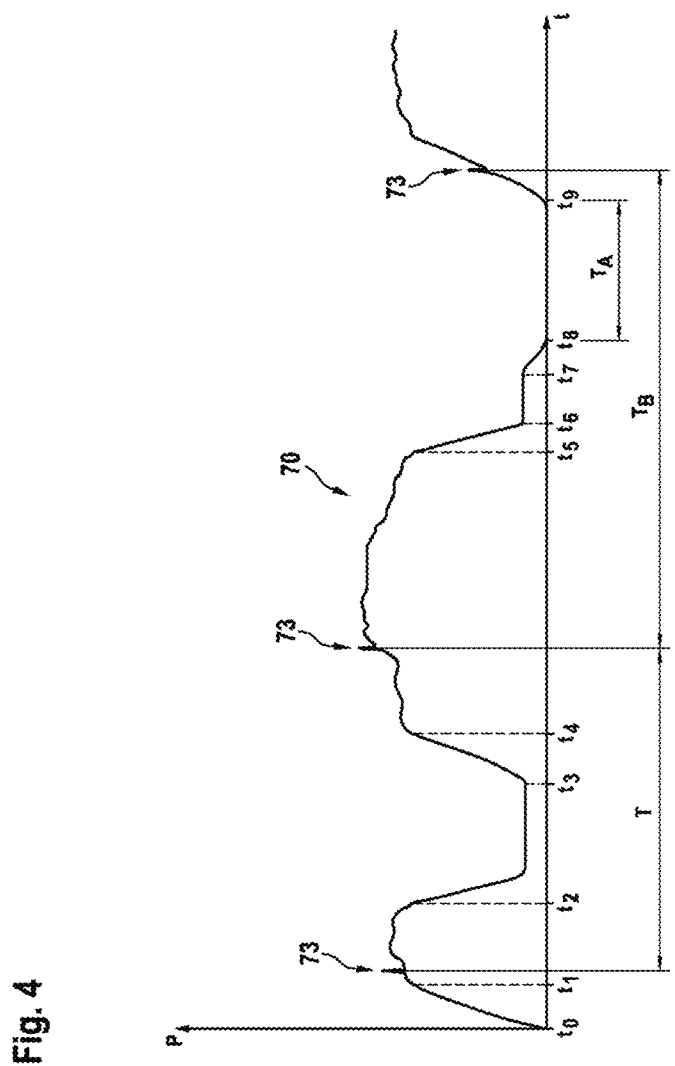
FIG. 4 shows a load profile recorded by the detection device.
Figure 5:
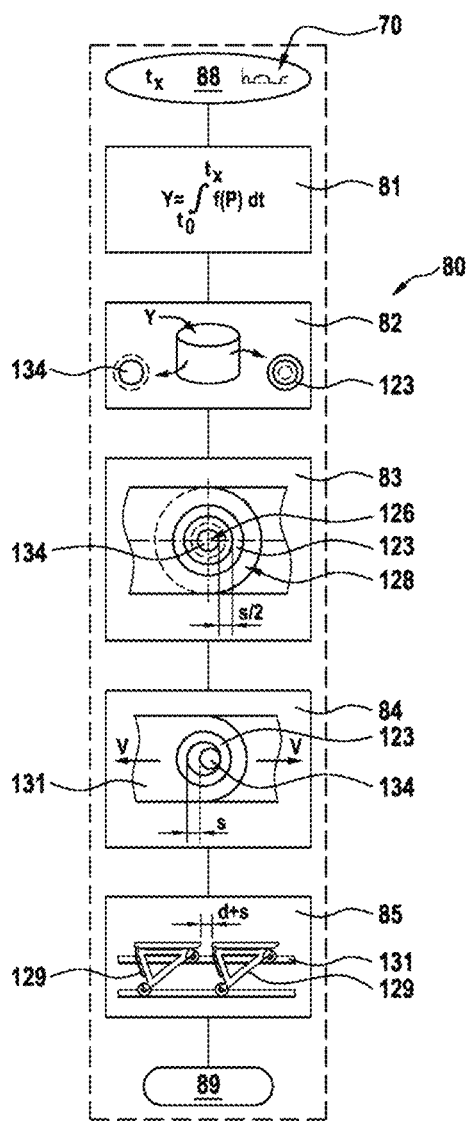
FIG. 5 shows method steps implemented in a set of rules for processing the load profile shown in FIG. 4 using components of the physical passenger transport system that are subject to wear, the wear phenomena for their component model data records being determined from the load profile.

In the following, FIG. 3 through 5 show by way of example how wear-related changes to traveling components of the physical passenger transport system 2 can be detected and from this characteristic properties of the affected components can be determined. To this end, the drive region 30 indicated in FIG. 2 has been shown enlarged and in greater detail in FIG. 3.

The drive train 35 of the passenger transport system 2 is arranged in the drive region 30. This substantially has a driving engine 33 having a reduction gear 32. A drive chain 36 is arranged between the drive sprocket 37 and a gear pinion 38 of the reduction gear 32. The conveyor chain 31 of the conveyor belt 7 is guided over the drive sprocket 37 and drives it. The conveyor chain 31 has articulation points 28 which are each formed from a chain pin 34 and a chain bush 23.

Furthermore, the control unit 17 of the passenger transport system 2 is accommodated in the drive region 30. This includes a frequency converter 61. The frequency converter 61 comprises a rectifier module 62 and an inverter module 63, which are connected to one another via a DC voltage intermediate circuit 65. The rectifier module 62 is connected to an electrical supply network 68 and the inverter module 63 is electrically connected to the driving engine 33. The frequency converter 61 also has a control module 64, via which the inverter module 63 and the rectifier module 62 are controlled. The control module 64 is connected to a control unit 66 of the controller 17. As symbolically indicated with two display scales I, U, a detection device 200 integrated in the control unit 66 receives information or measured values from the control module 64 of the frequency converter 61 about the voltage curve and the current curve that was output to the driving engine 33.

The individual measured values from current I and voltage U, calculated as power P and plotted in chronological order, result in the load profile 70 of the moving mechanical components, in particular of the conveyor belt 7 and the drive train 35. In FIG. 4, such a load profile 70 of the power P consumed by the driving engine 33 is shown over the time t.

In order to explain the load profile 70 in more detail, some striking points in time $t_0$ to $t_9$ are plotted on the horizontal time axis tin FIG. 4. The point in time to represents the beginning of the measured value detection, for example, the point in time during the start-up of the passenger transport system 2 after its production and installation in the building 5. The rise in the load profile curve indicates that the start up of the conveyor belt 7 takes place up to the time $t_1$ and that the conveyor belt is increasingly occupied by users. At the time $t_2$, all users have left the conveyor belt, which is why what is known as crawl travel is initiated by the control unit. From time $t_3$, the crawl travel is canceled, since users obviously step onto the conveyor belt again and the control unit brings the conveyor belt back to the nominal speed, which is reached at the time $t_4$. From the curve existing between the time $t_4$ and the time $t_5$, it can be seen that the conveyor belt is loaded very differently over a longer operating time. From the time $t_5$, the control unit initiates the crawl travel again up to the time $t_6$ and, in the absence of users, brakes the step belt from time $t_7$ to a standstill, which is reached at the time $t_8$. This standstill phase is canceled again at the time $t_9$ since other users want to use the passenger transport system.

The load profile 70 can also be evaluated for special events. For example, peaks 73 may occur periodically, as shown in FIG. 4. Such periodically occurring peaks 73 are a strong indication that there is a defect at the assigned point on the conveyor belt 7, for example, a breakage or bearing damage of a step roller or chain roller, a break in the step axle, and the like. It should be noted in this case that the standstill phases $T_A$ lengthen the period T between the peaks 73, so that a correspondingly longer period T B is present between two peaks 73.

As an alternative or in addition, as shown in FIG. 2, load sensors 75 can also be arranged as detection device 200 in the access regions of the passenger transport system 2, which detect the loads upon entry which the conveyor belt 7 has to convey. The measured values of the load sensors 75, plotted in chronological order, again result in a load profile 70 of the conveyor belt 2.

The detection device 200 can also have radar sensors 76 or light barriers 77, by means of which passengers are detected who enter the passenger transport system 2. The detected passengers are, for example, converted into a load profile 70 using load analyses stored in the set of rules 80 (see description for FIG. 5) with an average, assumed mass (for example, 85 kg).

As already shown in FIG. 1, the control unit 17 communicates via the interface 51 with the updated digital double dataset 102 installed in the data cloud 50, so that a transmission of measured values or measurement data detected by the detection device 200 or the load profile 70 can be transmitted.

In the updated digital double dataset 102, using the set of rules 80 shown in FIG. 5 and using the load profile 70 for the component model data records affected, their characterizing properties are updated. Since conversion rules and conversion formulas for updating their characterizing properties are stored in the set of rules 80 at least for a large number of component model data records of the updated digital double dataset 102, the explanations in the description of FIG. 5 are limited to the virtual articulation point 128 shown in FIG. 1 or their virtual chain pins 134 and their virtual chain bushing 123.

As shown in FIG. 5, the starting position 88 for applying the set of rules 80 is a load profile 70 which is continuously updated by the detection device 200 using measured values, and an update time $t_1$ triggered by a user or by the control unit 17. In a first control method step 81, the load profile 70 can be added up or integrated over the entire operating time $t_0$ to $t_x$ that has elapsed to date to form a load sum Y.

Using this load sum Y, in a second control method step 82, corresponding wear values based on empirical values and/or calculations can be determined for the component model data records affected by the load profile 70. The empirical values can be extracted from tests and existing passenger transport systems and stored in a database, for example, in the data cloud 50. On the basis of the characterizing properties determined by measurement on the physical passenger transport system 2 after its assembly and installation in a building 5, these wear values can then be used to determine the new characterizing properties intended for updating. In the specific example, the relative movements in the articulation point 28 of the physical conveyor chain 31 result in wear on its chain bushing 23 and its chain pins 34. In other words, this means that the characterizing property "outer diameter" of the chain pin 34 and the characterizing property "inner diameter" of the chain bush 23 are changed in a wear-related manner depending on the load sum Y.

As shown symbolically in the second control method step 82, the characterizing property "outer diameter" of the virtual chain pin 134 is updated by reducing the original actual value, which was measured at the physical chain pin 34 and which is represented by a broken line, by the determined wear value (shown with a solid line). The same takes place with the inside diameter of the component model data record of the virtual chain bush 123, which logically increases due to wear-related reasons.

In the third control method step 83, the updated characterizing properties of the virtual chain bush 123 and the virtual chain pin 134 replace their old characterizing properties, whereby the updated digital double dataset 102 is updated.

Since the physical conveyor chain 31 is pretensioned, the play s resulting from the wear is not distributed, as shown in the third control method step 83, concentrically to the pivot axis 126 of the virtual articulation point 128. Therefore, in the subsequent fourth control method step 84, a displacement of the virtual chain pin 134 to the virtual chain bush 123 corresponding to the prestressing force direction V must take place, specifically in all articulation points 128 of the virtual conveyor chain 31. As a result, a wear-related elongation of the virtual conveyor chain 131 is mapped in the updated digital double dataset 102.

In the fifth control method step 85, the virtual components arranged on the virtual conveyor chain 131 are also aligned according to the new positions of the virtual articulation point 128 so that, for example, the gap d between two virtual escalator steps 129 is increased by the play s.

With the repositioning of the virtual components affected by the elongation of the virtual conveyor chain 131, the application of the set of rules 80 with regard to the present example for the virtual articulation point 128 comes to an end 89.

It is clear from the foregoing designs that the set of rules 80 is not a simple formula, but rather a comprehensive computer program or part of a computer program of the updated digital double dataset 102. For example, a database with wear values can be stored in the set of rules 80, but a large number of algorithms, calculation methods from the field of physics, technical mechanics and strength theory, and stochastic calculation methods can also be implemented. The set of rules 80 can of course also contain an access control to external computer programs and databases in which these algorithms, calculation methods, and empirical values are implemented.

The set of rules 80 does not necessarily have to be a single computer program either. The set of rules 80 can be present in a decentralized manner as a plurality of sub-computer programs. It is preferably stored in the individual component model data records which calculation bases from set of rules 80 are used for its characteristic properties. It is particularly advantageous if the associated sub-computer program of the set of rules 80 is implemented in each component model data record.

Figure 6:
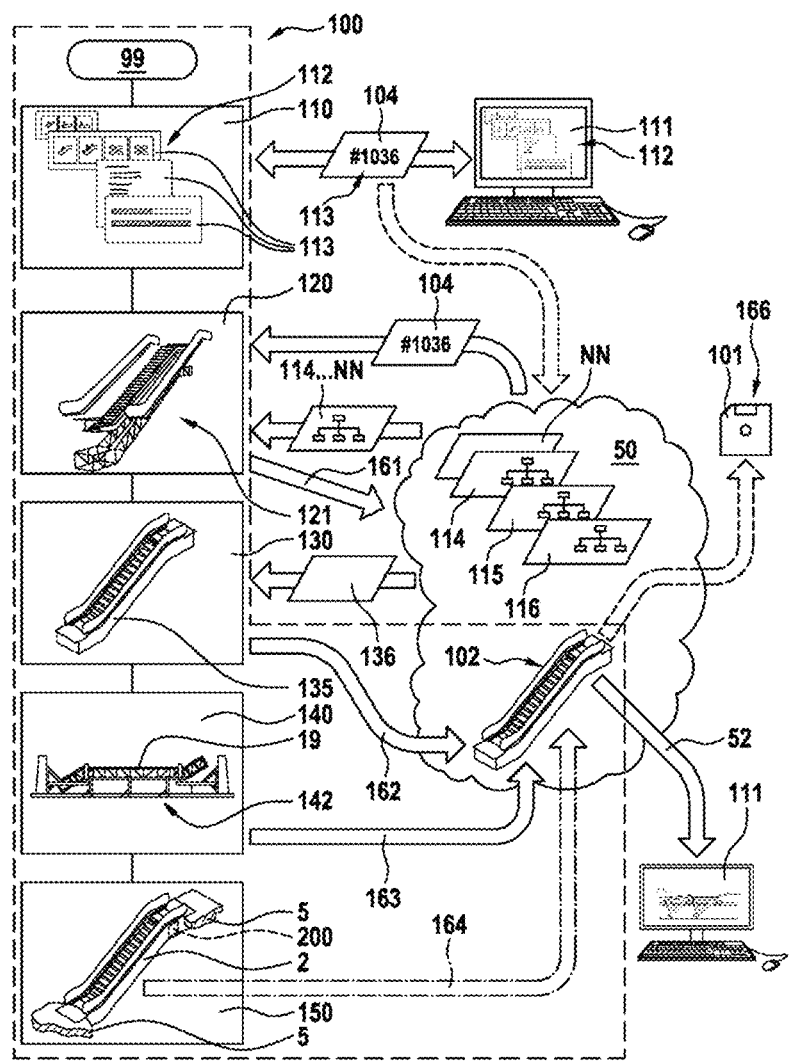
FIG. 6 illustrates a creation of an updated digital double dataset (UDDD) and the production of a physical passenger transport system as well as the start-up thereof and the continuous updating of the updated digital double dataset from configuration to operation of the physical passenger transport system.

FIG. 6 uses a diagram provided with additional information to illustrate the most important method steps of the inventive method 100 (indicated by a broken line) when creating an updated digital double dataset 102, producing a physical passenger transport system 2 during this creation, and the start-up of the physical passenger transport system 2, and updating the updated digital double dataset 102 based on the detected load profile 70. The primary method steps of the method 100 are divided into:

- in the first method step 110, acquiring the customer-specific configuration data 113;
- in the second method step 120, creating a commissioning digital double dataset, including component model data records and the customer-specific configuration data 113;
- in the third method step 130, transmitting the commissioning digital double dataset to a production digital double dataset;
- in the fourth method step 140, producing the physical passenger transport system 2 using the production digital double dataset; and,
- in the fifth method step 150, installing the physical passenger transport system 2 in a building 5 and updating the updated digital double dataset 102.

All data processing and data storage, as well as the step-by-step creation of the updated digital double dataset 102, takes place, for example, via the data cloud 50.

The starting position 99 for executing the inventive method 100 can be planning and later creating or converting a building 5, such as a shopping center, an airport building, a subway station, or the like. A passenger transport system 2 configured as an escalator or moving walkway is also optionally provided. The desired passenger transport system 2 is configured based on the operational profile and installation conditions.

For example, an internet-based configuration program which is permanently or temporarily installed in a computer system 111 can be available for this purpose. Customer-specific configuration data 113 are queried using various input masks 112 and stored in a log file 104 under an identification number. The log file 104 can be stored, for example, in the data cloud 50. The architect of the building 5 can optionally be provided with a digital envelope model using his customer-specific configuration data 113, and he can insert this envelope model into his digital building model for the purpose of visualizing the planned building. Coordinates of the intended installation space, the required maximum conveying capacity, conveying height, operating environment, etc., are queried, for example, as customer-specific configuration data 113.

If the architect is satisfied with the passenger transport system 2 he has configured, he can order it from the manufacturer by specifying the customer-specific configuration data 113, for example, by referring to the identification number or the identification code of the log file 104.

When an order is received, represented by the second method step 120, which is referenced to a log file 104, a digital double dataset 121 specifying a target configuration is initially created. When creating the digital double dataset 121, component model data records 114, 115, . . . , NN which are provided for manufacturing the physical components are used. This means that for each physical component, a component model data record 114, 115, NN is stored, for example, in the data cloud 50 and contains all the characterizing properties (dimensions, tolerances, material properties, surface quality, interface information for further component model data records, etc.) for this component in a target configuration.

Now the component model data records 114, 115, . . . , NN required to create the digital double dataset 121 are selected, and their number and arrangement in three-dimensional space are determined, using the customer-specific configuration data 113. These component model data records 114, 115, . . . , NN are then combined using their interface information to form a corresponding digital double dataset 121 of the passenger transport system 2. It is obvious that an escalator or moving walkway comprises several thousand individual parts (represented by the reference symbols . . . , NN) and consequently just as many component model data records 114, 115, NN must be used and processed to create a digital double dataset 121. The digital double dataset 121 has target data for all physical components to be manufactured or procured, these target data representing characterizing properties of the components required to construct the passenger transport system 2 in a target configuration. As illustrated by the arrow 161, the digital double dataset 121 can be stored in the data cloud 50 and to a certain extent also forms the starting basis for the updated digital double dataset 102.

In the third method step 130, the commissioning digital double dataset 135, which contains all the production data required for producing the commissioned passenger transport system 2, is created by supplementing the digital, three-dimensional double data record 121 with production-specific data 136. Such production-specific data 136 can include, for example, the production location, the material that can be used at this production location, the production means used to produce the physical component, lead times, and the like. As illustrated by arrow 162, this supplementing step is carried out in updated digital double dataset 102, which is still being constructed.

According to the fourth method step 140, the commissioning digital double dataset 135 can then be used in the production facilities 142 of the manufacturing plant (herein represented by welding template for a support structure 19) to enable production of the physical components (represented by a support structure 19) of the physical passenger transport system 2. The assembly steps for the physical passenger transport system 2 are also defined in the commissioning digital double dataset 135. During and after the manufacture of the physical components and during the assembly of the resulting physical passenger transport system 2, at least some of the characterizing properties of components and assembled component groups are detected, for example, using measurement and non-destructive testing methods, and are assigned to the corresponding virtual components and transmitted to the still unfinished updated digital double dataset 102. The actual data measured on the physical components replace the assigned target data of the commissioning digital double dataset 135 as the characterizing properties. As production progresses, the commissioning digital double dataset 135 increasingly becomes the updated digital double dataset 102 with this transmission, illustrated by the arrow 163. However, it is still not entirely complete; instead, a so-called production digital double dataset is formed first.

As shown in the fifth method step 150, after completion, the physical passenger transport system 2 can be installed in the building 5 according to the architect's plans. Since certain adjustments have to be made during installation, and operating data are produced even during the initial start-up, these data are also transmitted to the production digital double dataset and converted to characterizing properties of the virtual components affected thereby. With this update, illustrated by the dash-dotted arrow 164, the production digital double dataset becomes the updated digital double dataset 102, and, like the physical passenger transport system 2, reaches full operational readiness. From this point in time, the updated digital double dataset 102 can be loaded into the computer system 111 at any time and used for detailed analysis of the state of the physical passenger transport system 2.

The fifth method step 150 does not, however, represent the actual conclusion of the inventive method 100. This conclusion does not occur until the end of the service life of the physical passenger transport system 2, wherein in this case the data of the updated digital double dataset 102 can be used for the last time for the process of disposing of the physical components.

As described in detail above and symbolized by the dash-dotted arrow 164, the updated digital double dataset 102 is updated continuously and/or periodically throughout the entire service life of the passenger transport system 2 by the transmission of measurement data. As already mentioned, these measurement data can be detected both by the detection device 200 and by an input, for example, by maintenance personnel, and transmitted to the updated digital double dataset 102. Of course, the updated digital double dataset 102 can be stored together with the program instructions 166 required for working with the updated digital double dataset 102 on any storage medium as computer program product 101.

Although FIG. 1 through 6 relate to different aspects of the present disclosure and these have been described in detail using the example of an escalator, it is obvious that the described method steps and a corresponding device may be used in the same way for moving walkways, as well. Finally, it should be noted that terms such as "having," "comprising," etc. do not preclude other elements or steps, and terms such as "a" or "an" do not exclude a plurality of elements or steps. Furthermore, it should be noted that features or steps that have been described with reference to one of the above embodiments can also be used in combination with other features or steps of other embodiments described above. Reference signs in the claims should not be considered limiting.

The invention claimed is:

1. A method for monitoring a state of a physical passenger transport system using an updated digital double dataset (UDDD) which includes characterizing properties of components of the physical passenger transport system in a machine-processable manner, wherein:
   the physical passenger transport system comprises a traveling conveyor belt;
   the updated digital double dataset is constructed from component model data records which comprise data which were determined by measuring characterizing properties on the physical passenger transport system after the physical passenger transport system was assembled and installed in a building;
   the physical passenger transport system comprises has at least one detection device that detects a load profile of the conveyor belt during operation;
   this load profile is transmitted as measurement data to the updated digital double dataset and, using a set of rules, characterizing properties of the component model data records affected by the transmitted measurement data are redetermined;
   the characterizing properties of the affected component model data records are then updated with the redetermined characterizing properties; and
   based on the monitoring, changes and change trends in the updated characterizing properties of the traveling conveyor belt and their influence on components of the conveyor belt and on the components interacting with these components can be tracked and evaluated based on the updated digital double dataset by calculations and/or by static and dynamic simulations.

2. The method of claim 1, wherein the load profile detected by the detection device can represent a drive power generated by a driving engine over an operating time and can be calculated and created from a detected current curve and a voltage curve of the driving engine based at least partially on a driving engine temperature.

3. The method of claim 2, wherein the detected load profile is examined for periodically occurring peaks and, when peaks occur, these are assigned to a point on the conveyor belt.

4. The method of claim 1, wherein the detection device is a radar sensor or a light barrier by which passengers are detected who enter the passenger transport system, wherein the detected passengers are converted into a load profile.

5. The method of claim 1, wherein the detection device can be a load sensor arranged in the physical passenger transport system configured to directly detect loads that are conveyed by the passenger transportation system, wherein the detected loads are converted into a load profile.

6. The method of claim 1, wherein, based on the set of rules, the load profile is added up or integrated over an entire operating time to a load sum and wear values corresponding to the load sum are extracted based on empirical values for the component model data records affected by the load profile, and wherein with these, based on the characterizing properties determined by measurements on the physical passenger transport system after its assembly and installation in the building, new characterizing properties intended for updating can then be determined.

7. The method of claim 1, wherein the measurement data transmitted by the detection device and/or the characterizing properties determined therefrom can be stored with time information in a log file.

8. The method of claim 6, wherein a change trend of the measured values is determined by using statistical methods based on the measurement data and/or characterizing properties stored in the log file and operating data stored in the log file at a given conveying load of the conveyor belt and/or the characterizing properties.

9. The method of claim 1, wherein monitoring the state of the physical passenger transport system includes simulating future characterizing properties of the physical passenger transport system using the updated digital double dataset.

10. The method of claim 1, further comprising creating the updated digital double dataset, wherein creating the updated digital double dataset comprises:
   creating a commissioning digital double dataset with target data which reproduce the characterizing properties of components of the passenger transport system in a target configuration;
   creating a production digital double dataset based on the commissioning digital double dataset by measuring actual data which reproduce characterizing properties of components of the physical passenger transport system in the actual configuration of the passenger transport system immediately after assembly and installation thereof in a building and replacing target data in the commissioning digital double dataset with corresponding actual data; and
   creating the updated digital double dataset based on the completion digital double dataset by updating the completion digital double dataset during operation of the physical passenger transport system at least partially based on the load profile detected by the detection device.

11. The method of claim 10, wherein creating the commissioning digital double dataset includes creating a digital double dataset from component model data records taking into account customer-specific configuration data and creating production data by modifying the digital double dataset taking into account production-specific data.

12. A device for monitoring a state of a physical passenger transport system, the device comprising:
   an updated digital double dataset built from component model data records, which updated digital double dataset reproduces characterizing properties of components of the physical passenger transport system in an actual configuration of the physical passenger transport system in a machine-processable manner after assembly and installation thereof in a building; and
   at least one detection device configured to detect a load profile of a conveyor belt of the passenger transport system during operation;
   wherein the load profile can be transferred to the updated digital double dataset as measurement data for the purpose of updating existing data and wherein using a set of rules characterizing properties of the component model data records affected by the transmitted measurement data can be redetermined and these can be updated with the redetermined characterizing properties; and based on static and dynamic simulations on the updated digital double dataset, changes and change trends of the characterizing properties of a traveling virtual conveyor belt and the effects on virtual components of the passenger transport system interacting with this component can be traced and evaluated.

13. A passenger transport system comprising the device of claim 12.

14. A non-transitory computer readable medium comprising machine-readable program instructions which, when executed on a programmable device, cause the device to monitor a state of a physical passenger transport system using an updated digital double dataset (UDDD) which includes characterizing properties of components of the physical passenger transport system in a machine-processable manner, wherein:

the physical passenger transport system comprises a traveling conveyor belt;

the updated digital double dataset is constructed from component model data records which comprise data which were determined by measuring characterizing properties on the physical passenger transport system after the physical passenger transport system was assembled and installed in a building;

the physical passenger transport system comprises has at least one detection device that detects a load profile of the conveyor belt during operation;

this load profile is transmitted as measurement data to the updated digital double dataset and, using a set of rules, characterizing properties of the component model data records affected by the transmitted measurement data are redetermined;

the characterizing properties of the affected component model data records are then updated with the redetermined characterizing properties; and based on the monitoring, changes and change trends in the updated characterizing properties of the traveling conveyor belt and their influence on components of the conveyor belt and on the components interacting with these components can be tracked and evaluated based on the updated digital double dataset by calculations and/or by static and dynamic simulations.

\* \* \* \* \*